(12) United States Patent
Fenny et al.

(10) Patent No.: US 10,829,204 B2
(45) Date of Patent: Nov. 10, 2020

(54) ELECTRIC REACTION CONTROL SYSTEM

(71) Applicant: Textron Innovations Inc., Providence, RI (US)

(72) Inventors: Carlos Fenny, Fort Worth, TX (US); Sung Kim, Bedford, TX (US); Kip Campbell, Hurst, TX (US); Jouyoung Jason Choi, Southlake, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 16/206,088

(22) Filed: Nov. 30, 2018

(65) Prior Publication Data
US 2020/0172237 A1 Jun. 4, 2020

(51) Int. Cl.
| | |
|---|---|
| *B64C 29/00* | (2006.01) |
| *B64C 19/00* | (2006.01) |
| *F04D 25/06* | (2006.01) |
| *B64C 15/14* | (2006.01) |

(52) U.S. Cl.
CPC .......... *B64C 15/14* (2013.01); *B64C 29/0016* (2013.01); *F04D 25/06* (2013.01)

(58) Field of Classification Search
CPC ...... B64C 15/14; B64C 29/0016; F04D 25/06
USPC .............................................................. 701/3
See application file for complete search history.

(56) References Cited

U.S. PATENT DOCUMENTS

| | | | |
|---|---|---|---|
| 3,472,470 A | 10/1969 | Pauli | |
| 2015/0225079 A1 | 8/2015 | Starck et al. | |

FOREIGN PATENT DOCUMENTS

| | | | |
|---|---|---|---|
| CA | 2593953 A1 | | 2/2008 |
| CN | 105947187 A | | 9/2016 |
| CN | 206243453 U | * | 6/2017 |
| EP | 2256036 A2 | | 12/2010 |
| GB | 2531468 A | | 4/2016 |
| WO | 2004002821 A1 | | 1/2004 |

OTHER PUBLICATIONS

Borchers, Paul, et al, YAV-8B Reaction Control System Bleed and Control Power Usage in Hover and Transition, NASA Technical Memorandum 104021, Apr. 1994, pp. 1-48.
EP 19 15 4248, European Search Report, dated Jul. 2, 2019, 3 pages.

\* cited by examiner

*Primary Examiner* — Brian P Sweeney
(74) *Attorney, Agent, or Firm* — Whitaker Chalk Swindle & Schwartz PLLC; Enrique Sanchez, Jr.

(57) ABSTRACT

An electric reaction control system that can selectively expel a "burst" or "puff" of air to alter the orientation of the aircraft during flight. An aircraft incorporating ducting, an air compressor, an electric motor, and a plurality of nozzles can facilitate in-flight trajectory modifications. When an air burst is needed to provide thrust for the purposes of reaction control, nozzles are selectively opened and closed to provide roll, pitch, and yaw of the aircraft. The ERCS can facilitate an electric aircraft that would be very agile and very light, utilizing electric power, as opposed to jet power.

20 Claims, 4 Drawing Sheets

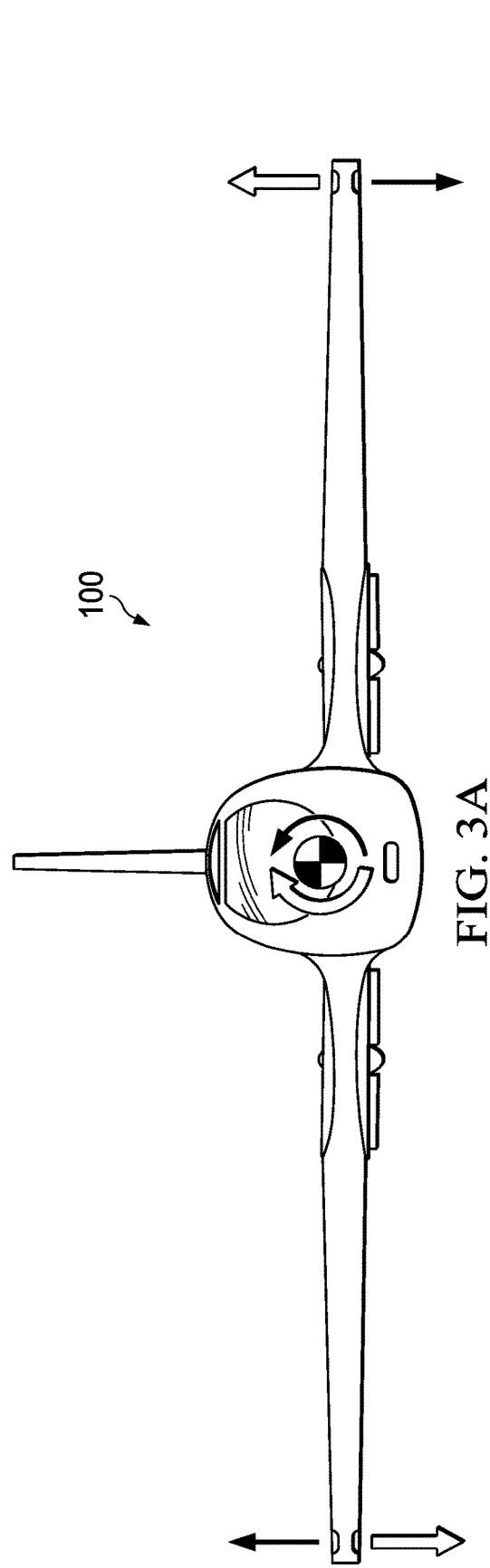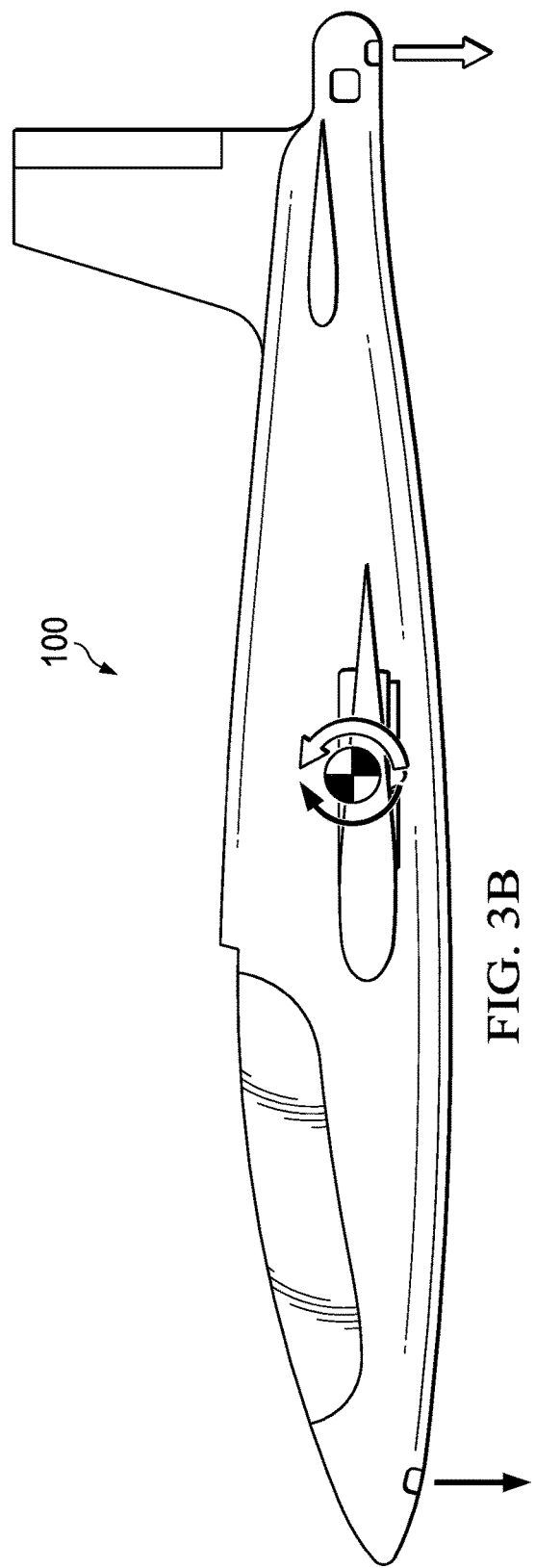
FIG. 3A
FIG. 3B

ELECTRIC REACTION CONTROL SYSTEM

BACKGROUND

1. Field of the Invention

The present invention is generally related to electric aircraft and hybrid electric aircraft, and more specifically to electric and hybrid electric Vertical Take Off and Landing aircraft utilizing air bursts to alter the orientation of the aircraft during vertical flight.

2. Background of the Invention and Description of Related Art

Past and present aircraft configurations utilizing lift fans to achieve both Vertical Take Off and Landing (VTOL) and airplane mode capabilities position their fans at the extreme corners of the airframe to achieve attitude control. This positioning maximizes the effective moment of the fans to achieve an acceptable level of attitude control authority. However, integrating both lift and attitude control functions into the lift fans results in increased aircraft weight, rotational inertia, complexity of controls, and compromised airplane mode aerodynamics. Two prior art examples of this configuration are the Dolak VZ-4 developed in the late 1950's and the recently developed Boeing Phantom Swift.

By way of example, the AV-8 Harrier takes off, hovers, and lands vertically using power from jet engine thrust directed downward through four rotating lift nozzles. The lift nozzles however are incapable of providing precise roll, pitch and yaw attitude control of the aircraft necessary for vertical flight. Attitude control on the Harrier is provided by a control system incorporating high-pressure bleed air from the engine that is conveyed to the wing tips, nose, and tail of the aircraft using a system of air ducts. The ends of these ducts include apertures capable of throttling and directing air. Forward pitch control is obtained by increasing aperture on the tail and decreasing the aperture on the nose, while aft pitch control is obtained by increasing aperture on the nose and decreasing the aperture on the tail. Roll control uses differential control of the apertures on the wing tips and yaw control is provided by differential control of the apertures on the sides on the tail. For all attitude control inputs the total lift force on the aircraft remains constant.

Positioning the lift fans inboard close to the fuselage can improve aircraft weight, rotational inertia, and aerodynamics. However, with the fans positioned close to the fuselage their effective moment is reduced to where they cannot provide adequate attitude control authority. Incorporating a jet engine powered bleed air control system similar to the Harrier aircraft is problematic on a lift fan aircraft. The Harrier engine is uniquely designed with large compressor turbine stages to provide a huge mass flow of air to both the forward lift nozzles and the control system. Turboshaft engines of the configuration used to power the lift fans are incapable of providing adequate air mass flow for bleed air control systems. Additionally, any bleed air drawn from a conventional turboshaft engine significantly reduces the engines total power output. Further, future lift fan aircraft utilizing electric propulsion to power fans will not have an existing source of bleed air to support a Harrier design control system.

SUMMARY

An electric reaction control system is disclosed that can selectively expel a "burst" or "puff" of air to alter the orientation of the aircraft during flight. The present disclosure incorporates ducting, an air compressor, an electric motor, a plurality of nozzles in an aircraft to facilitate the in-flight trajectory modifications. VTOL aircraft cannot use surfaces to change its trajectory due to a lack of airflow over the surfaces. Ideally, the thrust is placed at the tips of the aircraft, where the greatest moment arm exists, with the mass as close to the center of the aircraft as possible to minimize the moment of inertia to either pitch, roll, or yaw the aircraft.

An agile aircraft should have the center of mass very close in, with very low inertia. Typical electric aircraft solutions to the agility include disposing propellers at the far ends of the aircraft. Electric aircraft have no source of "bleed" air, generated by a jet engine, to leverage in positioning the aircraft. The present disclosure implements an electric motor with an air compressor to generate "bleed" air. Advantageously, the electric reaction control system (ERCS) can support an unconventional aircraft where you had the lift system for the propulsion close to the center of the aircraft with nozzles at the extremities of the aircraft for control, which makes this aircraft ideal for high speed missions. Typically, most electric aircraft cannot attain high speeds due to the rotor configurations. The ERCS could facilitate an electric aircraft that would be very agile and very light, utilizing electric power, as opposed to jet power.

Accordingly, one embodiment of the present disclosure includes an electric reaction control system, comprising: an aircraft having air ducting disposed within the aircraft; an air compressor operably coupled to the ducting and configured to pressurize the air in the ducting; a high-speed electric motor configured to drive the air compressor; a pressure control valve configured to control the air pressure in the ducting; and a plurality of nozzles operably coupled to the ducting and configured to selectively expel a burst of air to alter the orientation of the aircraft during flight. Each nozzle can include an aperture that controllably varies in size. The electric reaction control system further comprising a flight control computer configured to control the size of the aperture. The flight control computer can be operably coupled to a user input device. The air compressor can be a constant-speed air compressor, a centrifugal air compressor, an axial air compressor, or other suitable air compressor. The nozzles can be located on opposite sides of a wing tip, on opposite sides of a vertical fin, near the fore and aft ends of the aircraft, or at other suitable locations on the aircraft.

Another embodiment of this disclosure includes a method for controlling the orientation of an aircraft, comprising: generating an air pressure in an aircraft air duct, via an air compressor and a high-speed electric motor; receiving user input related to the orientation of the aircraft; and regulating expulsion of a burst of air through one or more nozzles operably coupled to the duct to alter the orientation of the aircraft during flight. The aircraft's pitch can be controlled by expelling a burst of air from the nozzle located near the fore end or aft end of the aircraft. The aircraft's roll can be controlled by expelling a burst of air from the nozzle located on the top of a wing tip on the starboard side and the bottom of a wing tip on the port side or the top of a wing tip on the port side and the bottom of a wing tip on the starboard side. The aircraft's yaw can be controlled by expelling a burst of air from the nozzle located on the port side or the starboard side of a vertical fin. Each nozzle can include an aperture that controllably varies in size. The method can further comprise controlling the size of the aperture via a flight control computer. Wherein the flight control computer receives data from a user input device. The air compressor can be a constant-speed air compressor, a centrifugal air compressor, an axial air compressor, or other suitable compressor.

BRIEF DESCRIPTION OF THE DRAWINGS

FIG. 3A is a schematic front view indicating the air burst direction related to an aircraft's roll control, in accordance with an embodiment of the present disclosure;

FIG. 3B is a schematic side view indicating the air burst direction related to an aircraft's pitch control, in accordance with an embodiment of the present disclosure.

DETAILED DESCRIPTION

The preferred version of the inventions presented in the following written description and the various features and advantageous details thereof are explained more fully with reference to the non-limiting examples included in the accompanying drawings and as detailed in the description which follows. Descriptions of well-known components are omitted so as to not unnecessarily obscure the principle features of the invention as described herein. The examples used in the following description are intended to facilitate an understanding of the ways in which the invention can be practiced and to further enable those skilled in the art to practice the invention. Accordingly, these examples should not be construed as limiting the scope of the claimed invention.

Figure 1:
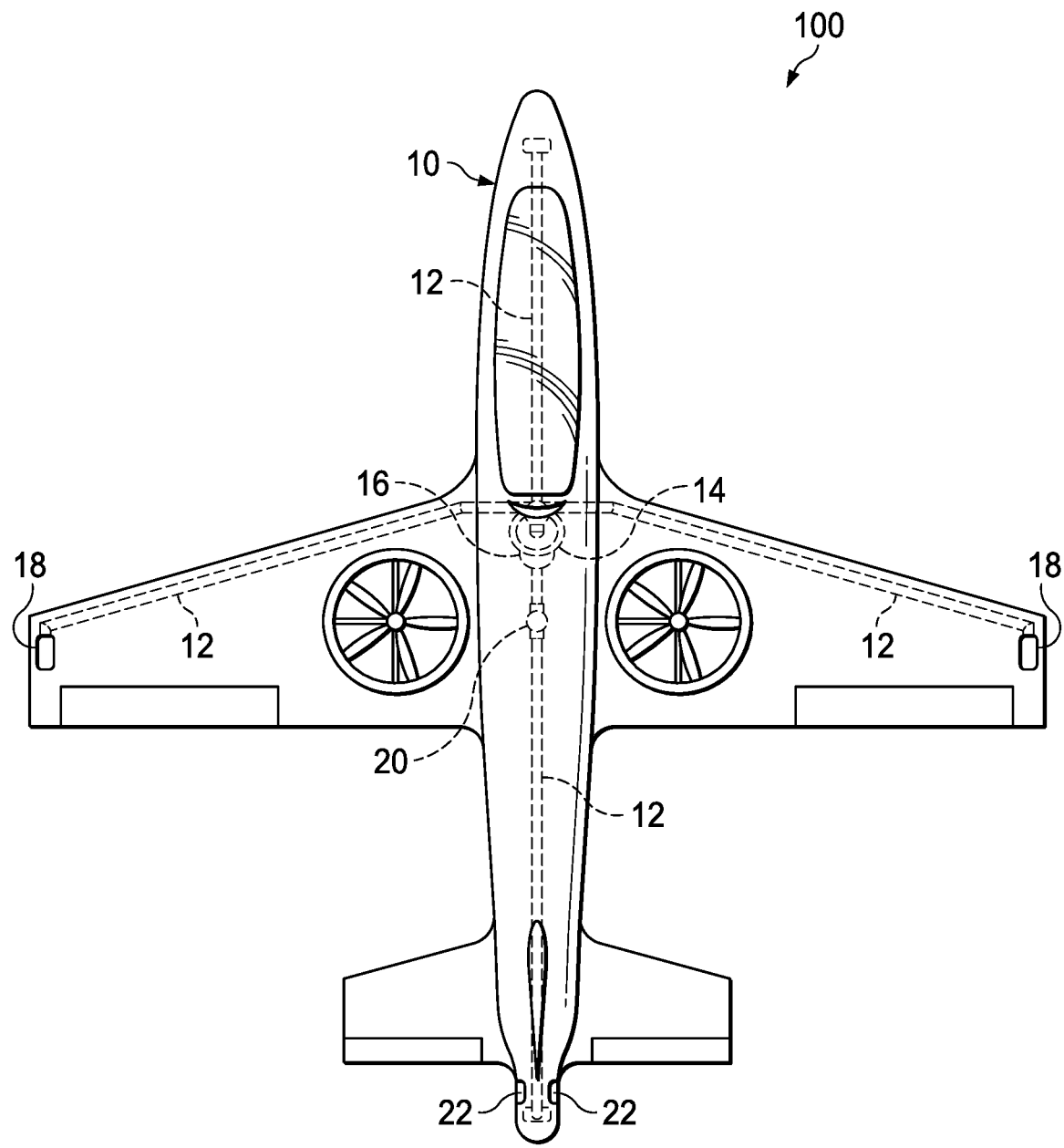
FIG. 1 is a schematic top view of an electric reaction control system, in accordance with an embodiment of the present disclosure.

FIG. 1 is a schematic top view of an electric reaction control system, generally designated as 100, in accordance with an embodiment of the present disclosure. An electric reaction control system (ERCS) 100 can include an aircraft 10, high pressure air ducting 12, an air compressor 14, a high-speed electric motor 16, roll nozzles 18, a pressure control valve 20, yaw nozzles 22, and pitch nozzles 24. The electric reaction control system 100 is configured to alter the orientation of the aircraft 10 during flight.

The aircraft 10 can be any type of aircraft, however an electric aircraft is preferred. The aircraft 10 can incorporate ducted fans, propellers, jet engines, or any suitable thrust-generating system to achieve flight. The high pressure air ducting 12 can be disposed throughout the aircraft 10. The ducting 12 can extend radially from the air compressor 14 to the furthest points within the aircraft 10. The aircraft 10 can include one or more lengths of the ducting 12. The ducting 12 is preferably a high-pressure air ducting that can maintain a predetermined air-pressure.

In a preferred embodiment, the air compressor 14 can be a centrally-mounted turbine air compressor 14 that is driven by a high-speed electric motor 16. Alternatively, the air compressor 14 can be a centrifugal compressor, an axial compressor, or other suitable compressor. The air compressor 14 preferably operates at a constant speed. By running at a constant speed, the air compressor 14 can immediately provide the thrust needed to operate the reaction control system, such that there is little to no lag time in spooling-up the electric motor 16. Advantageously, the power density for electric motors has greatly improved, overcoming the weight drawbacks typically associated with electric motors. For example, electric motors that operate at 2,000 RPM typically produce approximately 5 kilowatts per kilogram. By taking that same power requirement and operating the electric motor at 40,000 RPM, the power density doubles, producing 10 kilowatts per kilogram, and thereby reducing the weight of the electric motor 16 and increasing the viability of its use in aircraft applications. Accordingly, the electric motor 16 is preferably a high-speed electric motor, operating at or above 40,000 RPM. The electric motor 16 can be a brushless, DC motor. When an electric motor spins at the lower RPM for the same power, the diameter of the electric motor increases. And when the diameter of the electric motor increases, it has trouble rejecting the accumulation of heat. Ideally the electric motor would have low torque and high RPM, which conceptually sizes the electric motor like a pencil, instead of like a pancake. By operably coupling the air compressor 14 with the high-speed electric motor 16, the greatest possible power density is generated at an acceptable weight for aircraft applications, with faster response times.

The high-speed electric motor 16 can drive the air compressor 14, which in turn can fill the ducting 12 with air at a specific air pressure. To maintain the proper pressure in the ducting 12, the pressure control valve 20 can be operably coupled to the ducting 12 so that the pressure control valve 20 can expel air out of the center of the aircraft. Such expelling of air can provide a nominal amount of additional lift to the aircraft 10. One or more roll nozzles 18 can be operably coupled to the aircraft 10, and located on opposite sides of one or more wings, thereby helping to control the roll of the aircraft 10. One or more yaw nozzles 22 can be operably coupled to the aircraft 10, and located on opposite sides of a vertical fin, thereby helping to control the yaw of the aircraft 10. The roll nozzles 18 and yaw nozzles 22 can be disposed at the furthest ends of the ducting 12, or at any point along the ducting 12.

The nozzles 18, 22, and 24 can include an aperture that selectively opens and closes to control the expulsion of air therethrough. Electrical control systems such as a flight control computer or fly-by-wire system, or mechanical control systems such as push-rods or cables, can be operably coupled to the nozzles 18, 22, and 24 to selectively control them. The flight control computer can selectively control the aperture size and the amount of time that the aperture is opened, among other relevant control parameters. The flight control computer can be operatively coupled to a user input device to allow for user-directed control of the nozzles 18, 22, and 24. Alternatively, the user input device can indirectly control the nozzles 18, 22, and 24 via the flight control computer. The flight control computer can send signals to the nozzles 18, 22, and 24 to control the nozzles 18, 22, and 24. The signals can be pulse-width modulation signals, sinusoidal signals, power signals, or other suitable signals for controlling the nozzles. The flight control computer can provide greater maneuverability or stabilization specific to each different aircraft's application. The flight control computer can control the air compressor 14 and the electric motor 16. The flight control computer can control the air compressor 14 to maintain the air pressure in the ducting 12, as well as the RPM of the electric engine 16. The roll nozzles 18, yaw nozzles 22, and pitch nozzles 24 can be operated independently or dependently, with similar or varying parameters, depending upon the requirements to properly position the aircraft 10. By expelling one or more "puffs" or "bursts" of air from one or more of the nozzles 18, 22, and 24, the orientation of the aircraft 10 can be modified.

Greater mass flow provides greater thrust, which provides more force to rotate the aircraft 10. Closed loop control between this pressure control valve and the high seed electric motor ensure adequate mass flow. The mass flow provides the thrust vector. The mass flow and the direction of the mass flow can vary. The mass flow can be varied by selectably regulating the opening of the nozzle aperture to expel an air burst. Alternatively, the nozzle aperture opens to a predetermined size, but fluctuates so a series of tiny puffs or bursts of air can be expelled. In one exemplary embodiment, the aircraft 10 can include a gyro-system, operably coupled to the flight control computer, which can measure the aircraft's roll, pitch, and yaw position, as well as the rate of change of the aircraft's roll, pitch, and yaw position. The gyro-system measurements can be provided to the flight control computer, which can operate electro-mechanical actuators or hydraulic actuators to control the nozzles. The ERCS 100 can be a partial-authority system, where the nozzles can be controlled within certain thresholds, or a full-authority system, where the nozzles can be fully controlled.

Figure 2:
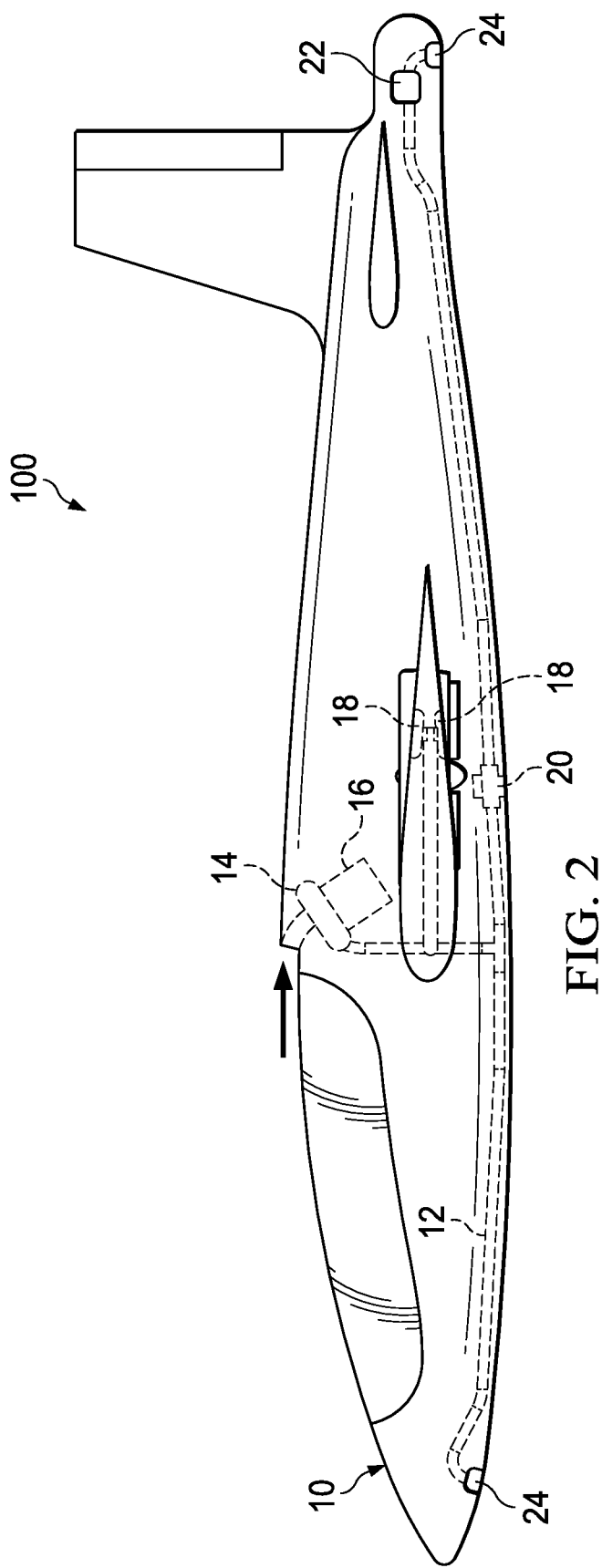
FIG. 2 is a schematic side view of an electric reaction control system, in accordance with an embodiment of the present disclosure.

FIG. 2 is a schematic side view of an electric reaction control system, in accordance with an embodiment of the present disclosure. To maintain the proper pressure in the ducting 12, the pressure control valve 20 can be operably coupled to the ducting 12 so that the pressure control valve 20 can expel air out of the center of the aircraft. Such expelling of air can provide a nominal amount of additional lift to the aircraft 10.

One or more roll nozzles 18 can be operably coupled to the aircraft 10, and located on opposite sides of one or more wings, thereby helping to control the roll of the aircraft 10. One or more pitch nozzles 24 can be operably coupled to the aircraft 10, and located near the fore (nose) and aft (tail) ends of the aircraft 10, thereby assisting with the control of the pitch of the aircraft 10. The roll nozzles 18 and pitch nozzles 24 can be disposed at the furthest ends of the ducting 12, or at any point along the ducting 12. A RAM air intake can be disposed on the fuselage of the aircraft 10 to provide airflow to the air compressor 14.

FIG. 3A is a schematic front view indicating the air burst direction related to an aircraft's roll control, in accordance with an embodiment of the present disclosure. In operation, when an air burst is needed to provide thrust for the purposes of reaction control, nozzles are selectively opened and closed to provide roll of the aircraft. For the purposes of roll, the ducting can extend to the tips of the wing that can open either above or below the wing to provide roll. The aperture can be opened to emit the airburst. The air bursts can be executed simultaneously, sequentially, or with any suitable timing or duration. The duration of the air burst can affect the magnitude of the thrust vector, such that longer air bursts can create more mass flow, resulting in a greater thrust vector magnitude. As stated above, the nozzle apertures can be opened electrically through a flight control computer or fly-by-wire system, or mechanically via operably coupled push-rods or cables.

To induce a clockwise roll on the aircraft, the aperture on the nozzle on the bottom-side of one wing and the top-side of the other wing causes the aircraft to roll clockwise, as seen from the fore of the aircraft. White arrows at the wing tips indicate the direction of the air burst and the white arrow in the center of the aircraft indicate the resultant roll direction. To induce a counter-clockwise roll on the aircraft, the aperture on the nozzle on the top-side of one wing and the bottom-side of the other wing causes the aircraft to roll counter-clockwise, as seen from the fore of the aircraft. Black arrows at the wing tips indicate the direction of the air burst and the black arrow in the center of the aircraft indicate the resultant roll direction.

FIG. 3B is a schematic side view indicating the air burst direction related to an aircraft's pitch control, in accordance with an embodiment of the present disclosure. In operation, when an air burst is needed to provide thrust for the purposes of reaction control, nozzles are selectively opened and closed to provide pitch of the aircraft. For the purposes of forward and aft pitch, the ducting can extend to the underside of the tip of the nose of the aircraft and to the underside of the back of the tail of the aircraft, with nozzles disposed proximate the end of each duct. At the tail of the aircraft, the nozzle points downward (on the under-side of the aircraft). At the nose of the aircraft, the nozzle also points downward. This nozzle orientation allows the aircraft to change its pitch by either opening the tip nozzle or the tail nozzle. The aperture can be opened to emit the airburst. The air bursts can be executed simultaneously, sequentially, or with any suitable timing or duration. The duration of the air burst can affect the magnitude of the thrust vector, such that longer air bursts can create more mass flow, resulting in a greater thrust vector magnitude. As stated above, the nozzle apertures can be opened electrically through a flight control computer or fly-by-wire system, or mechanically via operably coupled push-rods or cables.

To induce a clockwise pitch change on the aircraft, as seen from the side of the aircraft, the aperture on the nozzle on the under-side of the tip of the nose of the aircraft is opened to emit an air burst. A black arrow at the tip of the nose of the aircraft indicates the direction of the air burst and the black arrow at the center of the aircraft indicates the resultant pitch direction. To induce a counter-clockwise pitch change on the aircraft, as seen from the side of the aircraft, the aperture on the nozzle on the under-side of the tip of the tail of the aircraft is opened to emit an air burst. A white arrow at the tip of the tail of the aircraft indicates the direction of the air burst and the white arrow at the center of the aircraft indicates the resultant pitch direction.

Figure 3C:
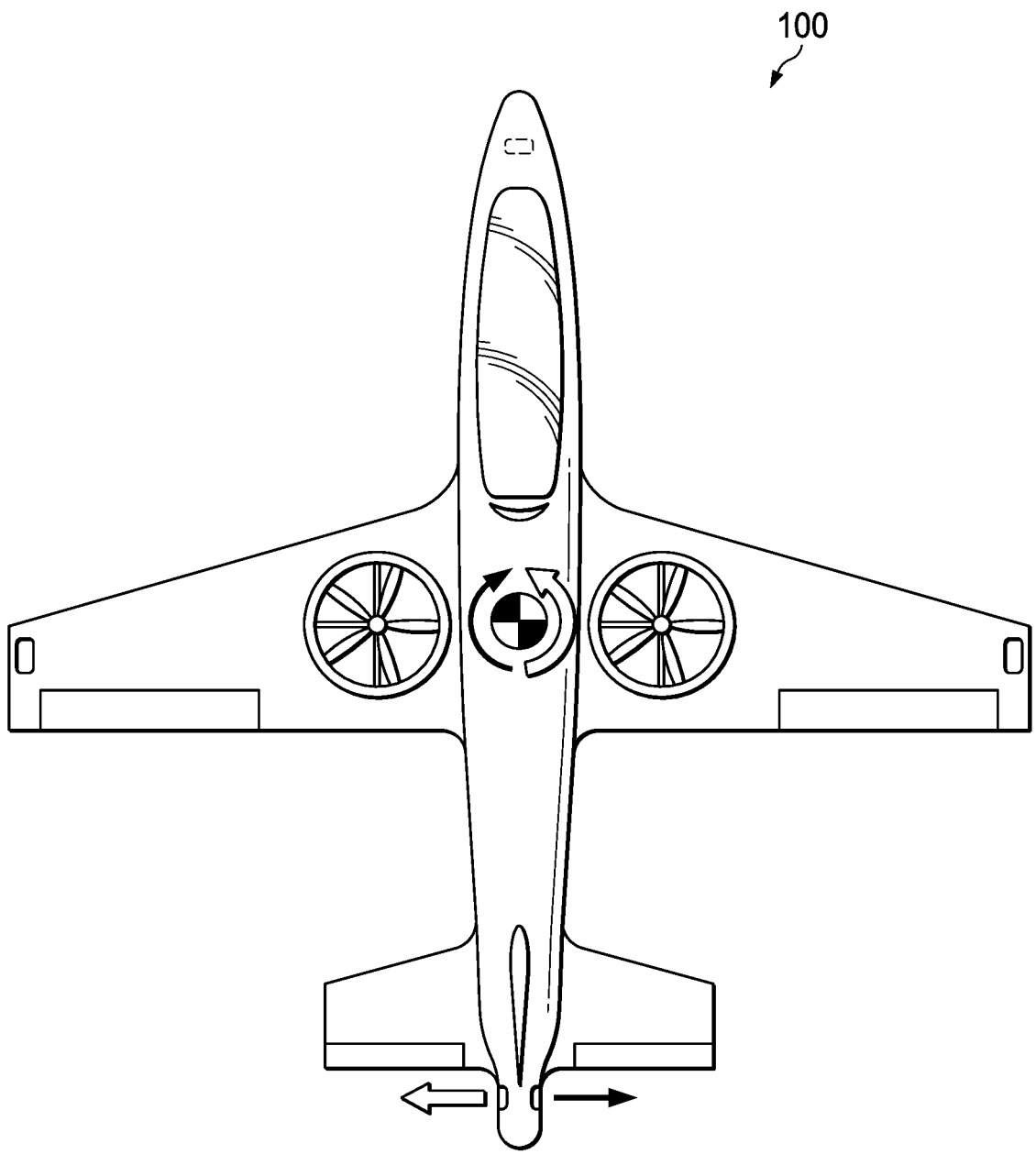
FIG. 3C is a schematic top view indicating the air burst direction related to an aircraft's yaw control, in accordance with an embodiment of the present disclosure.

FIG. 3C is a schematic top view indicating the air burst direction related to an aircraft's yaw control, in accordance with an embodiment of the present disclosure. In operation, when an air burst is needed to provide thrust for the purposes of reaction control, nozzles are selectively opened and closed to provide yaw of the aircraft. For the purposes of yaw, the ducting can extend to the underside of the tip of the nose of the aircraft and to the underside of the back of the tail of the aircraft, with nozzles disposed proximate the end of each duct. At the tail of the aircraft, the nozzle points downward (on the under-side of the aircraft). At the nose of the aircraft, the nozzle also points downward. This nozzle orientation allows the aircraft to change its pitch by either opening the tip nozzle or the tail nozzle. The aperture can be opened to emit the airburst. The air bursts can be executed simultaneously, sequentially, or with any suitable timing or duration. The duration of the air burst can affect the magnitude of the thrust vector, such that longer air bursts can create more mass flow, resulting in a greater thrust vector magnitude. As stated above, the nozzle apertures can be opened electrically through a flight control computer or fly-by-wire system, or mechanically via operably coupled push-rods or cables.

To induce a clockwise yaw change on the aircraft, as seen from the top of the aircraft, the aperture on the nozzle on the starboard-side of the tail of the aircraft is opened to emit an air burst. A black arrow at the starboard-side of the tail of the aircraft indicates the direction of the air burst and the black arrow at the center of the aircraft indicates the resultant clockwise yaw direction. To induce a counter-clockwise yaw change on the aircraft, as seen from the top of the aircraft, the aperture on the nozzle on the port-side of the tail of the aircraft is opened to emit an air burst. A white arrow at the port-side of the tail of the aircraft indicates the direction of the air burst and the white arrow at the center of the aircraft indicates the resultant counter-clockwise yaw direction.

Jet-powered aircraft can utilize bleed air in ducting for various functionality. The bleed air mist be cooled or the ducting must be made of high-heat tolerant materials, such as titanium or steel. By using electric compressed air, the air temperature is reduced from approximately 400 degrees Fahrenheit (with bleed air) to approximately 220 degrees Fahrenheit. The air temperature reduction can allow the use of lighter high-temperature composite materials (such as high temperature epoxy composite material, woven Kevlar, silicones, or other suitable materials) to decrease aircraft weight.

The present invention achieves at least the following advantages:
1. increased agility due to the use of air bursts near aircraft extremities;
2. reaction time reduction due to constant air pressure in ducting;
3. weight reduction due to high-speed electric engine and potential use of composite materials for ducting; and
4. increased stability due to the near-CG positioning of the electric fans as opposed to the wing tips.

While the disclosure has described a number of embodiments, it is not thus limited and is susceptible to various changes and modifications without departing from the spirit thereof. Persons skilled in the art will understand that this concept is susceptible to various changes and modifications, and may be implemented or adapted readily to other types of environments. For example, different nozzle location and count, as well as different electric motor sizing are all within the scope of the present disclosure. Further, the individual elements of the claims are not well-understood, routine, or conventional. Instead, the claims are directed to the unconventional inventive concept described in the specification.

What is claimed is:

1. A minimum lag-time electric reaction control system, comprising:
    an aircraft having air ducting configured to control pitch, roll, and yaw, disposed within the aircraft;
    an air compressor operably coupled to the ducting and configured to pressurize air in the ducting;
    a high-speed electric motor configured to drive the air compressor;
    a pressure control valve configured to control the air pressure in the ducting;
    a plurality of nozzles disposed along pitch, roll, and yaw axes at extremities of the aircraft operably coupled to the ducting and configured to selectively expel a burst of air to alter the pitch, roll, and yaw orientation of the aircraft during flight; and
    a flight control computer configured to generate pulse-width modulated signals to vary timing, duration, volume, and sequence of the burst of air from each of the plurality of nozzles.

2. The electric reaction control system of claim 1, wherein each nozzle includes an aperture that controllably varies in size.

3. The electric reaction control system of claim 2, further comprising a flight control computer configured to control the size of the aperture.

4. The electric reaction control system of claim 3, wherein the flight control computer is operably coupled to a user input device.

5. The electric reaction control system of claim 1, wherein the air compressor is a constant-speed air compressor.

6. The electric reaction control system of claim 1, wherein the air compressor is a centrifugal air compressor.

7. The electric reaction control system of claim 1, wherein the air compressor is an axial air compressor.

8. The electric reaction control system of claim 1, wherein the nozzles are located on opposite sides of a wing tip.

9. The electric reaction control system of claim 1, wherein the nozzles are located on opposite sides of a vertical fin.

10. The electric reaction control system of claim 1, wherein the nozzles are located near the fore and aft ends of the aircraft.

11. A minimum-lag method for controlling the orientation of an aircraft, comprising:
    generating an air pressure in an aircraft air duct configured to control pitch, roll, and yaw, via an air compressor and a high-speed electric motor and a pressure control valve;
    receiving input related to the pitch, roll, and yaw orientation of the aircraft; and
    regulating expulsion of a burst of air through one or more nozzles by receiving pulse-width modulated signals from a light control computer to vary timing, duration, volume, and sequence of the burst of air from each of the plurality of nozzles operably coupled to the duct to alter the orientation of the aircraft during flight.

12. The method of claim 11, wherein the aircraft's pitch is controlled by expelling a burst of air from the nozzle located near the fore end or aft end of the aircraft.

13. The method of claim 11, wherein the aircraft's roll is controlled by expelling a burst of air from the nozzle located on the top of a wing tip on the starboard side and the bottom of a wing tip on the port side or the top of a wing tip on the port side and the bottom of a wing tip on the starboard side.

14. The method of claim 11, wherein the aircraft yaw is controlled by expelling a burst of air from the nozzle located on the port side or the starboard side of a vertical fin.

15. The method of claim 11, wherein each nozzle includes an aperture that controllably varies in size.

16. The method of claim 15, further comprising controlling the size of the aperture via a flight control computer.

17. The method of claim 16, wherein the flight control computer receives data from a user input device.

18. The method of claim 11, wherein the air compressor is a constant-speed air compressor.

19. The method of claim 11, wherein the air compressor is a centrifugal air compressor.

20. The method of claim 11, wherein the air compressor is an axial air compressor.

* * * * *